May 25, 1937. M. WEBER 2,081,315
CONSTANT LEVEL APPARATUS
Filed Jan. 26, 1934 2 Sheets-Sheet 1
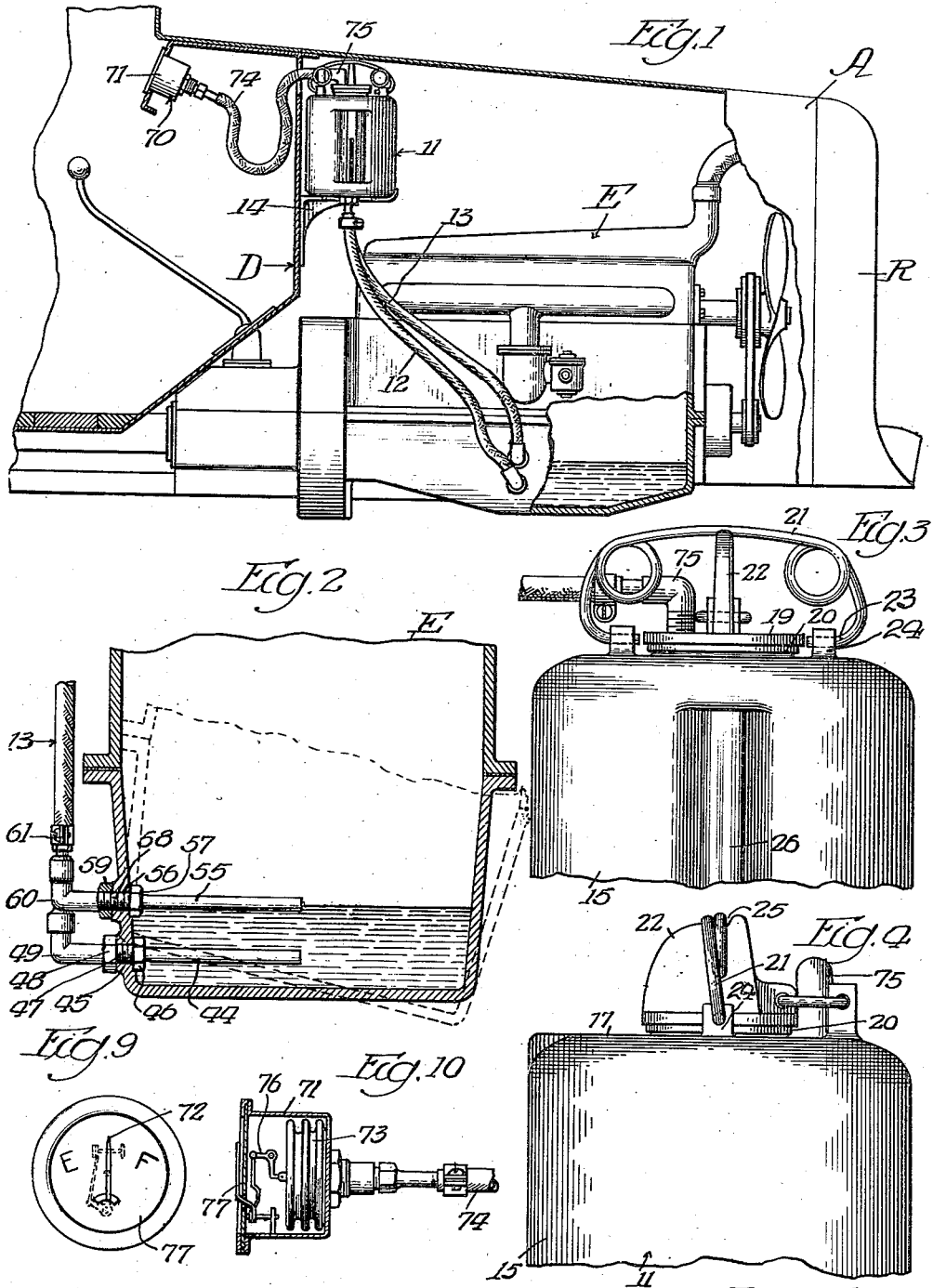

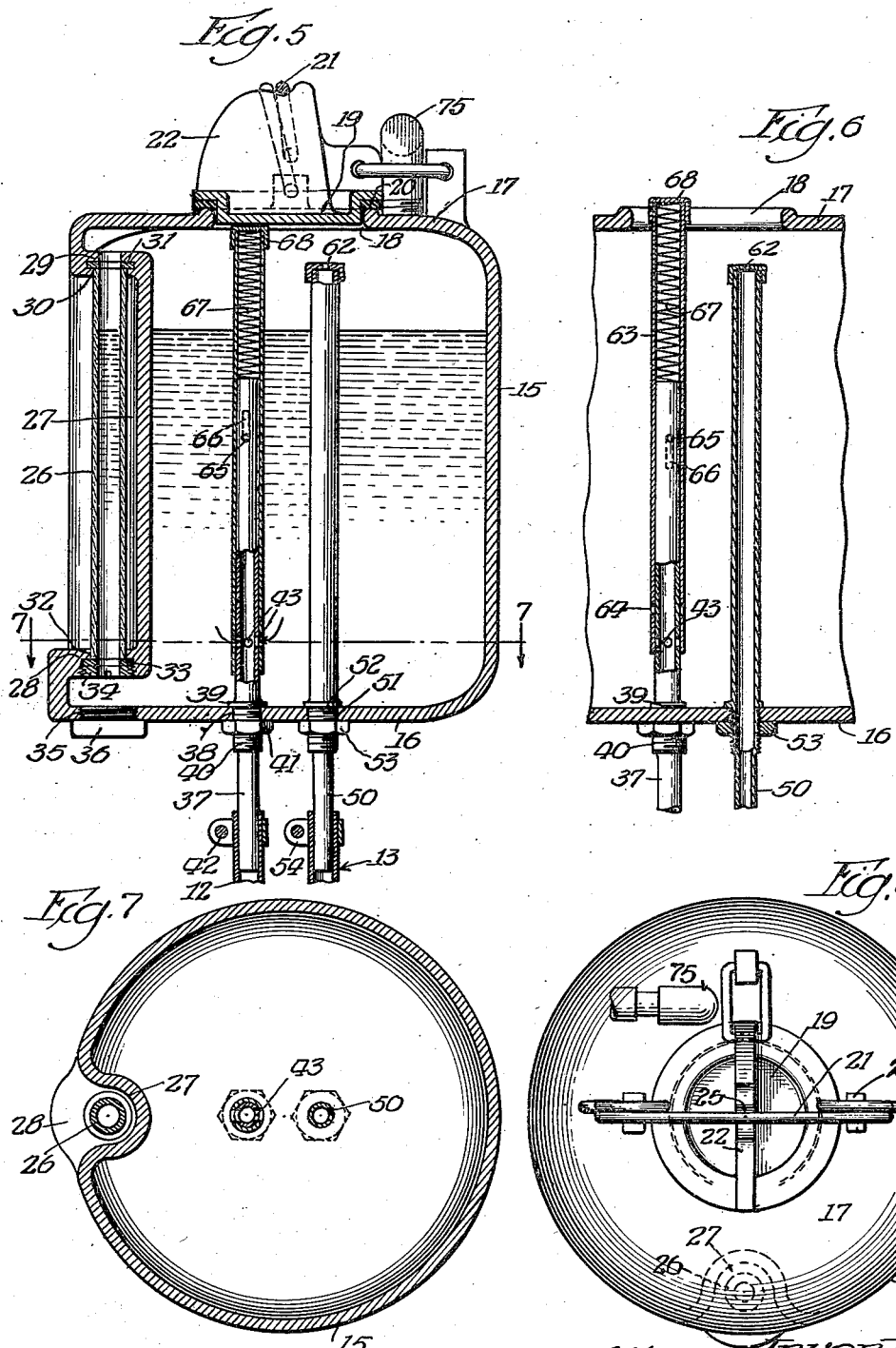

Patented May 25, 1937

2,081,315

UNITED STATES PATENT OFFICE 2,081,315

CONSTANT LEVEL APPARATUS

Max Weber, Chicago, Ill.

Application January 26, 1934, Serial No. 708,408

8 Claims. (Cl. 184—103)

The present invention relates generally to apparatus for maintaining a liquid, such as oil, at a constant level in a tank or case. More particularly, the invention relates to that type of apparatus which is designed to maintain a uniform or constant level of the oil in the crank case of an internal combustion engine for an automobile and comprises (1) an air-tight reservoir which is located above the crank case of the engine and contains a supply of oil for feed to the crank case, (2) a feed pipe which extends between the bottom portions of the reservoir and crank case, and serves to feed the oil in the reservoir to the crank case when the reservoir is vented, that is, when air is introduced into the reservoir, and (3) a vent pipe which leads from the desired level point in the crank case to the top of the reservoir and operates when the oil in the crank case drops below its proper or predetermined level, and exposes to atmosphere the crank case end of the vent pipe, to introduce air into the reservoir for oil venting purposes.

One object of the invention is to provide an apparatus of this type which operates efficiently and positively to maintain a constant or uniform level of the oil in the crank case of the automobile engine with which it is associated regardless of tilting, jarring or rocking of the engine during drive of the automobile, by reason of the fact that the crank case end of the vent pipe terminates at the proper or desired level to be maintained for the oil and also at the intersection of the longitudinal and transverse centers of the crank case. By so locating or arranging the inner end of the crank case end of the vent pipe, air is introduced into the reservoir via the vent pipe only when the oil drops below its proper level, and no venting of the reservoir takes place when the engine is rocked or tilted inasmuch as the oil at the point of intersection of the longitudinal and transverse centers of the crank case remains at a uniform height regardless of the degree of tilting or rocking of the engine.

Another object of the invention is to provide an apparatus of the last mentioned character in which the crank case end of the feed pipe extends through the crank case and directly underlies the crank case end of the vent pipe in order to prevent the entry of air into the reservoir via the feed pipe during tilting, jarring or rocking of the engine.

A further object of the invention is to provide a constant level apparatus of the feed and vent pipe and reservoir type in which the reservoir is provided with a cover-closed opening in the top thereof, in order that it may be filled, and the reservoir end of the feed pipe is provided with a vertically sliding valve which is arranged so that it is held in its open position when the cover of the reservoir is in its closed position, and is automatically closed upon removal of the cover from the receptacle in order automatically to cut off the feed pipe when the reservoir is vented as the result of opening the cover.

A still further object of the invention is to provide a constant level apparatus which is generally of new and improved construction, may be manufactured at a low and reasonable cost, and operates not only in a positive and efficient manner but also to effect a material saving in oil consumption and cause better or more increased engine performance.

Other objects of the invention and the various advantages and characteristics of the present apparatus will be apparent from a consideration of the following detailed description.

The invention consists in the several novel features which are hereinafter set forth and are more particularly defined by claims at the conclusion hereof.

In the drawings which accompany and form a part of this specification or disclosure, and in which like numerals of reference denote corresponding parts throughout the several views:

Figure 1 is a view partly in section and partly in side elevation of an automobile engine to which is applied an apparatus embodying the invention;

Figure 2 is an enlarged, vertical, transverse section of the crank case of the engine, showing in detail the construction and arrangement of the crank case ends of the vent and feed pipes of the apparatus;

Figures 3 and 4 are enlarged views of the upper portion of the reservoir, taken at right angles to one another;

Figure 5 is a vertical section of the reservoir illustrating in detail the construction and arrangement of the cover, and showing the manner in which the reservoir ends of the vent and feed pipes are connected to the bottom of the reservoir;

Figure 6 is a section illustrating the design and arrangement of the valve at the reservoir end of the feed pipe, and disclosing the manner in which it operates to close the feed pipe when the cover is removed from the reservoir for reservoir filling purposes;

Figure 7 is a horizontal section on the line 7—7 of Figure 5;

Figure 8 is a plan view of the reservoir;

Figure 9 is a front view of the suction operated device for registering when there is no more oil in the reservoir; and Figure 10 is a section of the device of Figure 9.

The apparatus which forms the subject matter of the invention is adapted primarily for use in connection with an automobile A and operates automatically, and, as hereinafter described, to maintain the oil at the proper lever in the crank case of the engine. The engine is shown in the drawings more or less diagrammatically and is designated by the letter E, and is located at the front end of the automobile between the radiator R and the dashboard D. The crank case of the engine is shown as being filled with oil to the proper level. The apparatus is supported on the upper portion of the dashboard D of the automobile and comprises a reservoir 11, a feed pipe 12 and a vent pipe 13.

The reservoir 11 is located above the engine E on a bracket 14 and is preferably in the form of a one-piece metal casting. It consists of a substantially cylindrical side wall 15, a circular bottom 16, and a circular top 17, and contains a supply of oil for feed to the crank case of the engine E via the feed pipe 12. The bracket 14 is fixedly secured to the front face of the upper portion of the dashboard D and is shaped so as to receive snugly the bottom 16 of the reservoir and thus to hold the reservoir in place directly beneath the rear end of the hood of the automobile. The top 17 of the reservoir is provided with a circular opening 18 whereby the reservoir may be filled whenever necessary. This opening is normally closed by a cover 19 so that the receptacle is air-tight. The cover, as shown particularly in Figure 5 of the drawings, embodies a gasket 20 for engaging the portion of the top 17 that defines the opening 18. A spring 21 coacts with a cam-shaped lug 22 on the cover to hold the cover in its closed position. The lug is formed integrally with the central portion of the cover and projects upwardly therefrom. The spring 21 is in the form of a bail which overlies the reservoir opening 20 and has inturned lower ends 23. The latter are pivotally mounted in upstanding lugs 24 on the top of the reservoir and support the bail-shaped spring so that it may be swung over the lug 22 into a position wherein it rests on the top portion of the lug and forces the cover downwardly into sealing relation with respect to the reservoir opening. The portions of the spring directly above the inturned ends are in the form of loops so as to exert maximum downward pressure on the cover. When it is desired to open the cover in order to refill the reservoir, the central portion of the spring 21 is swung to one side of the lug 22. This frees the lug so that the cover may be readily withdrawn from the opening 20. A notch 25 is formed in the top portion of the lug 22 so as to hold the spring 21 against accidental displacement when it is in its cover-closed position. The spring and cover herein described and shown constitute simple means for releasably closing the reservoir and rendering the latter air-tight. In order to show the amount of oil in the reservoir, a gauge glass 26 is provided. This glass extends vertically and is disposed in a reentrant or recessed part 27 of the side wall 15 of the reservoir. The reentrant part 27, as shown in Figure 5, embodies a bottom wall 28 and a top wall 29 which are respectively spaced or positioned slightly above the bottom 16 of the reservoir and slightly below the reservoir top 17. The upper end of the glass 26 fits within, and communicates with the upper portion of the reservoir via a hole 30 in the top wall 29 of the reentrant part 27. A gasket or washer 31 surrounds the upper end of the gauge glass and forms a seal between the glass and the hole-forming portion of the top wall 31. The lower end of the gauge glass fits in, and communicates with the lower portion of the reservoir via a hole 32 in the bottom wall 28 of the reentrant part 27. It embodies a sealing washer 33 and is held in place by means of an externally threaded bushing 34 in the hole 32. By virtue of the fact that the upper and lower ends of the gauge glass communicate respectively with the upper and lower portions of the reservoir, oil in the reservoir fills the gauge glass to the level of the oil in the reservoir. Insertion or removal of the gauge glass is effected through the medium of a hole 35 in the reservoir bottom 16. This hole is aligned with the hole 32 in the bottom wall of the reentrant part of the reservoir of the side wall, and is normally closed by means of a screw plug 36.

The feed pipe 12 extends between the reservoir 11 and the crank case of the automobile engine E and operates as hereinafter described to feed oil from the reservoir to the crank case when the level of the oil in the case drops beneath a predetermined level. The main portion of the feed pipe, that is the portion exteriorly disposed, is preferably formed of rubber composition so that it is flexible, and is encased in a wire mesh sheath in order to protect it. The reservoir end of the feed pipe embodies a metal tube-like extension 37 whereby it is connected to the reservoir. This extension extends through an aperture 38 in the reservoir bottom 16 and is provided with a shoulder 39 which abuts against the top face of the bottom of the reservoir. The lower end of the extension 37 embodies a threaded portion 40. A nut 41 on this threaded portion bears against the under face of the reservoir bottom and serves to jam the shoulder 39 into clamped relation with the reservoir bottom so as to hold the extension 37 in place. The composition rubber tube portion of the feed pipe is attached to the lower or exposed end of the tube-like extension 37 by means of a clamp 42. Radially extending holes 43 in the portion of the extension that is directly above the shoulder establish communication between the upper end of the feed pipe 12 and the reservoir, so that oil in the reservoir is free to flow to the crank case when the reservoir is vented. The lower or crank case end of the feed pipe embodies a tube-like extension 44. This extension extends horizontally through a hole 45 in one of the side walls of the crank case of the engine and is arranged so that the inner end thereof, that is the end within the crankcase, is disposed beneath the level at which the oil is to be maintained in the crank case, and at the intersection of the longitudinal and transverse centers of the crank case. By so arranging or locating the inner end of the extension 44 the crank case end of the feed pipe is always covered against entry of air therein regardless of whether the engine is tilted or rocked (see Figure 2). This is due to the fact that at the point of termination of the other end of the tube-like extension 44, the height of the oil remains the same, as indicated in Figure 2 of the drawings. The tube-like extension 44 is held in place in the hole 45 by means of a nut 46 which is welded, soldered or otherwise fixedly secured to the inner face of the side wall of the crank case through which the extension extends. This nut receives a threaded part 47 on the outer end of the tube-like extension 44 and coacts with a nut or shoulder 48 on the aforesaid threaded part 47 to hold the extension in place. The outer end of the extension 44 is in the form of an elbow 49 and is secured by means of a clamp to the lower end of the composition rubber tube portion of the feed pipe. In connecting the extension 44 in place, the crank case is dropped or disconnected from the cylinder block part of the engine and then the hole 45 is drilled at the proper point in the crank case. After this step or operation, the nut 45 is soldered in place and then the tube-like extension 44 is passed through the hole and the nut 48 is jammed into place by screwing the threaded part 47 into the nut 46. Thereafter the crank case is again connected to the cylinder block of the engine and the lower end of the composition rubber tube part of the feed pipe is connected to the elbow 49. When the reservoir 11 is vented by the introduction of air therein, the oil in the reservoir flows downwardly through the feed pipe 12 into the crank case of the engine. As soon as the flow of air to the reservoir is stopped, feed of the oil from the reservoir to the crank case is cut off.

The vent pipe 13 is of the same general construction and internal diameter as the feed pipe 12. It leads from the interior of the reservoir to the crank case and the major part thereof, that is, the part outside of the reservoir and crank case, is preferably formed of composition rubber tubing and is surrounded or encased in a wire mesh sheath. The upper end of the vent pipe embodies a vertically extending tube-like extension 50 which extends through an aperture 51 in the reservoir bottom 16 and projects to a point slightly below the cover 19. The lower end of the extension 50 is secured in place by means of a shoulder 52 and a nut 53 which are clamped respectively by the section of the nut against the top and bottom faces of the reservoir bottom 16. The upper end of the composition rubber tube part of the vent pipe is sleeved over the extreme lower end of the extension 50 and is secured to the latter by means of a clamp 54. The lower or crank case end of the vent pipe embodies a horizontally extending tube-like extension 55. The latter passes through a hole 56 in the side wall of the crank case which has the hole 45, and is located directly above the tube-like extension 44 of the feed pipe. The extension 55 is disposed at the level at which the oil is to be maintained in the crank case, and is arranged so that the inner end thereof, that is the end within the crank case, terminates at the intersection of the longitudinal and transverse centers of the crank case. Because of this arrangement of the inner end of the tube 55, air is introduced into the reservoir via the feed pipe only when the oil in the crank case drops below its proper level, and the apparatus is not affected as far as operation is concerned by tilting, rocking or jarring of the engine. The tube-like extension 55 is secured in place by means of a nut 57 which is welded or otherwise secured against the inner face of the side wall of the crank case having the hole 56, and coacts with an externally threaded part 58 and a nut 59 on the outer end of the extension 55. Said outer end of the extension is shaped to form an elbow 60 and is connected to the lower end of the composition rubber tube part of the feed pipe by means of a clamp 61. The tube-like extension 55 is assembled, as far as the crank case is concerned, similarly to the extension 44 at the crank case end of the feed pipe. When the level of the oil in the crank case is at the proper level, the crank case end of the vent pipe 13 is closed or sealed by the oil, and hence the liquid in the reservoir 11 is locked against feed to the crank case. As soon as the level of the oil in the crank case of the engine E drops so as to effect exposure of the crank case end of the vent pipe, that is the tube-like extension 55, air flows through the vent pipe into the reservoir with the result that the oil in the reservoir feeds into the crank case via the feed pipe until the oil in the crankcase again reaches its proper level and closes the crank case end of the vent pipe. A restricted aperture 62 is formed on the extreme upper end of the tube-like extension 50 at the upper end of the vent pipe and serves to prevent locking of the liquid that is normally drawn up into the vent pipe upon closing of the crank case end thereof by the oil, as set forth and described in detail in my copending application for United States Letters Patent, filed May 8, 1933, Serial No. 669,994, now Patent No. 1,972,962 issued September 11, 1934.

For the purpose of closing the feed pipe when the reservoir 11 is opened for refilling thereof, a slide valve 63 is provided. This valve is in the nature of a sleeve which slides vertically on the upper end of the tube-like extension 37 at the reservoir end of the feed pipe 12. The lower end of the valve is provided with holes 64 which, when the valve is shifted downwardly as hereinafter described, register with the holes 43 in the extension 37 and effect communication of the feed pipe with the interior of the reservoir. Sliding movement of the valve is limited by means of a cross pin 65 which is carried by the central portion of the valve and extends through oppositely facing, vertically extending slots 66 in the upper end of the tube-like extension 37. A compression spring 67 is interposed between the upper end of the extension 37 and a cap 68 on the upper end of the valve and operates to shift the valve upwardly into its closed position when the cover 19 is removed from the reservoir. When the cover is in its closed position, the valve is forced downwardly against the action of the spring 67 into its open position wherein the holes 64 register with the holes 43. The pin and slot connection consisting of the cross pin 65 and the slots 66 operates to prevent ejection of the valve from the reservoir upon removal of the cover 19 by restricting upward shift of the valve. By employing the valve 63 and arranging it in the manner herein described and illustrated, the feed pipe is automatically cut off or closed when the cover 19 is opened and the vacuum in the reservoir is released. When the cover is again applied to the reservoir the valve is automatically shifted into its open position as soon as the cover is seated, with the gasket 20 thereof on the portion of the reservoir top which defines the opening 20.

In order to indicate to the driver of the automobile A when the reservoir 11 becomes empty, a suction-responsive device 70 is provided. This device comprises a casing 71 which is mounted in the instrument panel in front of the dashboard D of the automobile and has a pointer 72. The latter is under control of a diaphragm 73 which is disposed in the casing 71 and is connected by a hose 74 to an elbow 75 on the top of the reservoir. The elbow 75 extends through a hole in the top 17 so that the diaphragm communicates with the interior of the reservoir via the hose 74. When the reservoir is closed and suction exists therein, the diaphragm 73 is contracted. When air is admitted to the reservoir such, for example, as when the reservoir runs dry, the diaphragm expands. This expansion and contraction of the diaphragm is utilized to control or operate the pointer 72 through the medium of mechanism 76 which is disposed between the diaphragm and the pointer, and is arranged to translate expansion and contraction of the diaphragm into swinging movement of the pointer. The pointer is arranged so that it registers "empty" on a dial 77 in the casing when the diaphragm is in its expanded position. When the diaphragm is contracted because of the existence of suction in the reservoir, the pointer is swung away from its "empty" marking and indicates to the operator of the automobile that the reservoir contains a quantity of oil. When the oil in the crank case drops below its predetermined level and air is admitted into the reservoir, the pointer swings to its "empty" marking. This, however, is only momentary due to the fact that it again registers that oil is in the reservoir when the oil in the crank case rises to its proper level and seals the crank case end of the vent pipe. By employing the suction responsive device 70, the operator of the automobile can readily determine whether the apparatus is in operation and whether the reservoir is full.

The operation of the apparatus is as follows:

Assuming that there is oil in the reservoir, oil flows from the reservoir into the crank case of the engine E through the feed pipe 12 every time the crank case end of the vent pipe 13 is exposed as the result of lowering of the oil in the crank case beyond its proper level. When the oil reaches its proper level in the crank case, the crank case end of the vent pipe is cut off from atmosphere with the result that flow of oil to the crank case via the feed pipe stops. When the reservoir 11 becomes empty, the pointer 72 of the suction-responsive device 70 indicates this fact as the result of expansion of the diaphragm 73, due to the entrance of air into the reservoir. In order to fill the reservoir it is only necessary to swing the bail-shaped spring 21 away from the lug 22 and to remove the cover 19 from the opening 20 in the top of the reservoir. As soon as the cover is removed, the valve 63 is shifted into its closed position by the spring 67 and thus oil cannot flow through the feed pipe 12 into the crank case during filling of the reservoir.

The herein described apparatus is both efficient and positive in operation due to the fact that the tube-like extensions 44 and 55 at the crank case ends of the feed and vent pipes are so positioned and located with respect to the intersection of the longitudinal and transverse centers of the crank case that tilting or rocking of the engine does not affect the operation or cause air to be admitted into them when the oil in the crank case is at its proper level. Since but a small number of parts are employed in the apparatus, the latter may be manufactured at a low and reasonable cost. In practice it has been found that with the present apparatus, the engine will not become overheated and that better engine performance is obtained as well as a material saving in oil consumption. Overheating of the engine is prevented by reason of the fact that the oil being always at its "full" level in the crank case is not recirculated through the engine as often as it is when it drops to its "half" level and hence has sufficient opportunity to cool before recirculation thereof. Performance as well as efficiency of the engine is increased with the present constant level apparatus because with the oil in the crank case at its "full" level at all times there is no likelihood of the oil being circulated so often that it overheats and results in a carbon formation and such an increase in the temperature of the motor that the latter operates in a sluggish manner. Economy in oil consumption is effected by reason of the fact that with the oil at its "full" level at all times in the crank case the engine does not overheat and consume an undue quantity of oil or carbonize or thin the oil out to a point where it is necessary to change the oil in the crank case.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In combination with a vehicle having an internal combustion engine mounted thereon for propelling purposes, an apparatus for constantly maintaining the oil in the crank case of the engine at a predetermined level comprising an airtight reservoir mounted on the vehicle above said level and adapted to contain a supply of oil, a feed pipe having one end thereof connected to the bottom of the reservoir to receive oil therefrom and its other end extending into the crank case and terminating adjacent to the intersection of the longitudinal and transverse centers of the crank case and beneath said level and serving when the reservoir is vented to feed oil from the reservoir to the crank case, and a vent pipe having one end thereof leading to the top of the reservoir and its other end extending into the crank case and terminating at the level at which the oil is to be maintained in the crank case and at said intersection of the longitudinal and transverse centers of the crank case, and adapted when the oil in the crank case drops below its proper level and exposes to atmosphere its said other end to introduce air into the reservoir for oil-feeding purposes.

2. In combination with a vehicle having an internal combustion engine mounted thereon for propelling purposes, an apparatus for constantly maintaining the oil in the crank case of the engine at a predetermined level comprising an airtight reservoir mounted on the vehicle above the crank case and adapted to contain a supply of oil, a readily flexible feed pipe having one end thereof leading to the bottom of the reservoir to receive oil from the latter, and a substantially horizontal, tube-like extension at its other end extending transversely through and secured in one of the side walls of the crank case and terminating in the case at a point beneath said oil level and at the intersection of the longitudinal and transverse centers of the crank case, and serving when the reservoir is vented to feed oil from the reservoir to the crank case, and a readily flexible vent pipe having one end thereof leading to the top of the reservoir and a substantially horizontal, tube-like extension at its other end extending transversely through and secured in said one side wall of the crank case and arranged directly over and substantially parallel with the first mentioned extension and so that it terminates at the aforesaid oil level and at said intersection of the longitudinal and transverse centers of the crank case, said vent pipe being adapted when the oil in the crank case drops below its proper level and exposes to atmosphere its extension end to introduce air into the reservoir for oil-feeding purposes.

3. A feed device for use in an apparatus of the feed and vent pipe type for maintaining liquid at a constant level in a case or tank, comprising an air-tight reservoir having a filling opening in the top thereof and a cover for the opening, and adapted to contain a supply of liquid; a vertical tube in the reservoir having its lower end extending through the reservoir bottom and provided with means for connection to a portion of the feed pipe of the apparatus and having a hole in the side thereof disposed directly above the reservoir bottom and adapted to admit liquid into the tube from the reservoir; and means in the reservoir for automatically closing the hole in the tube when the cover of the receptacle is removed for filling purposes consisting of a vertical sleeve valve having the lower end thereof mounted slidably on the upper end of the tube and designed to expose the hole when the valve is shifted downwardly and to close the hole upon upward shift of the valve, and having its upper end engageable directly with the bottom face of the cover whereby it is automatically shifted downwardly into its open position and is held in such position when the cover is applied to the reservoir, and a compression spring between the upper end of the tube and the valve for shifting the valve upwardly into its closed position when the cover is removed from the reservoir.

4. A feed device for use in an apparatus of the feed and vent pipe type for maintaining liquid at a constant level in a case or tank, comprising an air-tight reservoir having a filling opening in the top thereof and a cover for the opening, and adapted to contain a supply of liquid; a vertical tube in the reservoir having its lower end extending through the reservoir bottom and provided with means for connection to a portion of the feed pipe of the apparatus and having a hole in the side thereof disposed directly above the reservoir bottom and adapted to admit liquid into the tube from the reservoir; and means in the reservoir for automatically closing the hole in the tube when the cover of the receptacle is removed for filling purposes consisting of a vertical sleeve valve having the lower end thereof mounted slidably on the upper end of the tube and designed to expose the hole when the valve is shifted downwardly and to close the hole upon upward shift of the valve, and having means at its upper end engageable with the cover whereby it is automatically shifted downwardly into its open position and is held in such position when the cover is applied to the reservoir, and a compression spring between the upper end of the tube and the upper portion of the valve for shifting the valve upwardly into its closed position when the cover is removed from the reservoir.

5. A feed device for use in an apparatus of the feed and vent pipe type for maintaining liquid at a constant level in a case or tank, comprising an air-tight reservoir having a filling opening in the top thereof and a cover for the opening, and adapted to contain a supply of liquid; a vertical tube in the reservoir having its lower end extending through the reservoir bottom and provided with means for connection to a portion of the feed pipe of the apparatus and having a hole in the side thereof disposed directly above the reservoir bottom and adapted to admit liquid into the tube from the reservoir; and means in the reservoir for automatically closing the hole in the tube when the cover of the receptacle is removed for filling purposes consisting of a vertical sleeve valve having the lower end thereof mounted slidably on the upper end of the tube and designed to expose the hole when the valve is shifted downwardly and to close the hole upon upward shift of the valve, and having means at its upper end engageable with the cover whereby it is automatically shifted downwardly into its open position and is held in such position when the cover is applied to the reservoir, a compression spring between the upper end of the tube and the upper portion of the valve for shifting the valve upwardly into its closed position when the cover is removed from the reservoir, and a pin and slot connection between the tube and the sleeve valve for limiting upward shift of the valve by the spring.

6. In combination with a vehicle having an internal combustion engine mounted thereon for propelling purposes, an apparatus for constantly maintaining the oil in the crank case of the engine at a predetermined level comprising an air-tight oil retaining reservoir associated with the engine and positioned above said level, a feed pipe having one end thereof connected to the bottom of the reservoir to receive oil therefrom and its other end extending into the crank case and terminating beneath said level, and serving when the reservoir is vented to deliver oil from the reservoir to the crank case, and a vent pipe having one end thereof leading to the top of the reservoir and its other end extending into the crank case and terminating at the level at which the oil is to be maintained in the crank case and at substantially the intersection of the longitudinal and transverse centers of the crank case, and adapted when the oil in the crank case drops below its proper level and exposes to atmosphere its said other end to introduce air into the reservoir for oil-feeding purposes.

7. In combination with a vehicle having an internal combustion engine mounted thereon for propelling purposes, an apparatus for constantly maintaining the oil in the crank case of the engine at a predetermined level comprising an air-tight reservoir mounted on the vehicle above said level and adapted to contain a supply of oil, a feed pipe leading downwardly from the bottom of the reservoir to the bottom portion of the crank case and serving when the reservoir is vented to feed oil from the reservoir to the crank case, and a vent pipe having one end thereof leading to the top of the reservoir and its other end extending through one of the side walls of the crank case and terminating in the case at the level at which the oil is to be maintained in the crank case and at substantially the intersection of the longitudinal and transverse centers of said crank case and arranged so that when the engine is in its normal position it extends horizontally and lies within the plane of said oil level, and adapted when the oil in the crank case drops below its proper level and exposes to atmosphere its said other end to introduce air into the reservoir for oil-feeding purposes.

8. In combination with a vehicle having an internal combustion engine mounted thereon for propelling purposes, an apparatus for constantly maintaining the oil in the crank case of the engine at a predetermined level comprising an airtight reservoir mounted on the vehicle above said level and adapted to contain a supply of oil, a feed pipe leading downwardly from the bottom of the reservoir to the bottom portion of the crank case and serving when the reservoir is vented to feed oil from the reservoir to the crank case, and a vent pipe having one end thereof leading to the top of the reservoir and a tube-like extension at its other end extending through and secured fixedly in one of the side walls of the crank case and terminating in the case at the level at which the oil is to be maintained in the crank case and at the intersection of the longitudinal and transverse centers of said crank case, and adapted when the oil in the crank case drops below its proper level and exposes to atmosphere the end of the tube-like extension to introduce air into the reservoir for oil-feeding purposes.

MAX WEBER.